Jan. 23, 1945.   G. C. THOMPSON ET AL   2,367,700
TERMINAL STUFFING TUBE
Filed Nov. 26, 1942

INVENTOR
GEORGE C. THOMPSON AND
BY ELLSWORTH E. SEAMAN
ATTORNEY

Patented Jan. 23, 1945

2,367,700

UNITED STATES PATENT OFFICE 2,367,700

TERMINAL STUFFING TUBE

George C. Thompson, Falls Church, Va., and Ellsworth F. Seaman, Washington, D. C.

Application November 26, 1942, Serial No. 467,066

6 Claims. (Cl. 285—25)

(Granted under the act of March 3, 1883, as amended April 30, 1928; 370 O. G. 757)

This invention relates to terminal stuffing tubes and has for its principal object the provision of a tube of the character described fabricated from a non-flammable plastic material, preferably one embodying a halogenated phenol formaldehyde, that is to say, a plastic having one of the halogens, chlorine, fluorine, or bromine added to the compound so as to reduce its flammability.

Another object of the invention is the provision of a stuffing tube of plastic material having a metallic plating covering its entire surface to further reduce its flammability, the tube being so shaped and designed as to occupy a minimum of space, thus permitting the tubes to be arranged in close proximity to one another when it is necessary to pass several rods or cables through a bulkhead or partition where restricted space renders close grouping imperative.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

Figure 2:
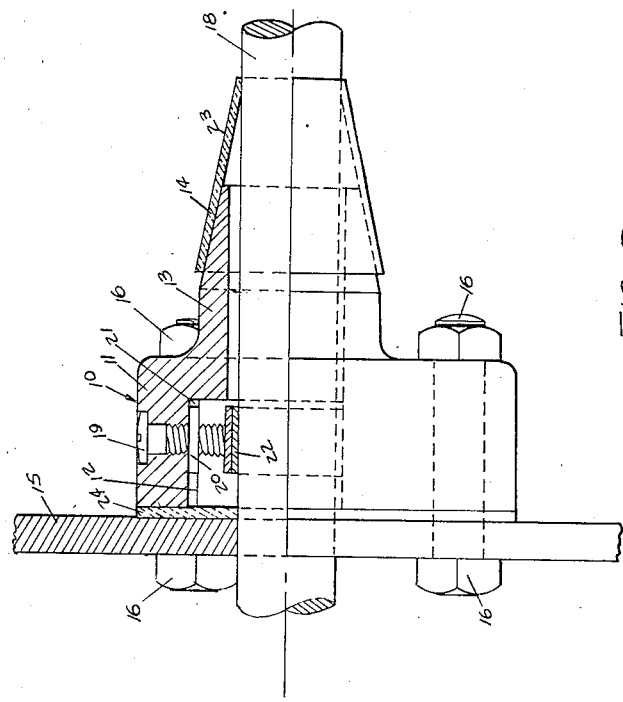
Figure 1:
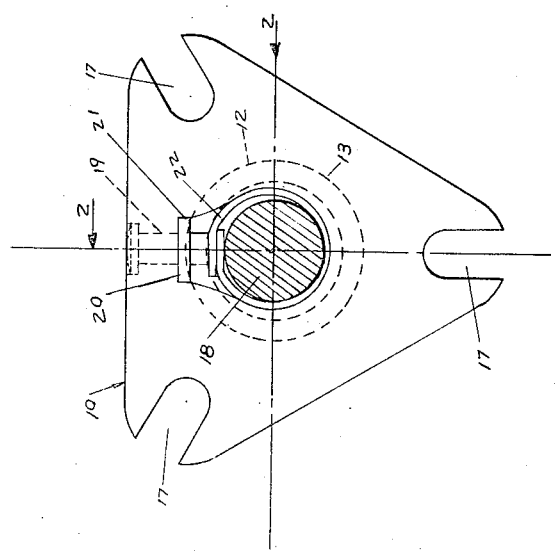

In the accompanying drawing:

Fig. 1 is an end elevational view of a terminal tube constructed according to the invention; and Fig. 2 is a view, partly in side elevation and partly in vertical longitudinal section, taken on line 2—2 of Fig. 1.

Referring to the drawing, a terminal stuffing tube 10 embodying the invention is shown as comprising a base portion 11 of triangular cross-section which is formed with a chamber 12 and a tubular extension 13 provided with a tapered outer end 14. The tube 10 is secured to a partition or bulkhead 15 by means of bolts 16 which pass through the bulkhead and through the slots 17 provided in the base portion 11.

A rod or cable 18 is shown as extending through the stuffing tube 10 and partition 15 and is secured against displacement therefrom by means of a set screw 19 which is threaded into a nut 20 seated against rotation in a socket 21 formed in the upper portion of the chamber 12. A screw 19 should be sealed by any suitable sealing material to render the stuffing tubes watertight at this point. This sealing material may be a thermoplastic material such as cellulose acetate or other suitable product. The screw 19 engages the overlapping ends of a strap 22 which extends around the cable 18 so as to prevent the cable from being marred or otherwise defaced by the clamping action of the screw 19. The leakage of air, moisture, or gas through the tube 10 is prevented by means of a tape 23 of a synthetic resinous material which is self-curing in nature and which will shrink upon application of heat from a soldering iron. This tape 23 when properly applied will tightly seal all possible openings between the tube 10 and cable 18, thus avoiding any passage of moisture therethrough. The assembly is rendered watertight by a suitable resilient gasket 24 interposed between the base 11 and the bulkhead 18.

In the present design of terminal tube the best results can be obtained from a standpoint of strength if a laminated material is employed. A maximum strength for this construction can be obtained with a fabric base impregnated with phenol formaldehyde or similar resin adequately cured so that polymerization will have taken place. Such a material is identified commercially by the trade names, "Micarta," "Textolite," "Panelyte," "Formica," etc.

It will be understood that, as previously stated, the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

What is claimed is:

1. A terminal tube comprising a triangular base portion adapted to be secured to one side of a bulkhead or partition with the sides of the base portions of adjacent tubes parallel with and in close proximity with one another to economize in space, and an extension of reduced cross-section, said base portion having a recess therein, clamping means disposed within said recess for securing a flexible cable or rod passing through said terminal tube against longitudinal movement therein and a shrinkable self-sealing flexible tape engageable with said extension and said flexible cable for preventing leakage through said terminal tube and bulkhead.

2. A terminal tube comprising a base portion adapted to be secured to one side of a bulkhead or partition and having a conical extension of reduced cross-section extending outwardly from said bulkhead, said base portion having a recess therein, clamping means disposed within said recess for securing a flexible cable or rod passing through said terminal tube against longitudinal movement therein and a conical sealing flexible member engageable with said extension and said flexible cable and capable of shrinking upon the application of heat for preventing leakage through said terminal tube and bulkhead.

3. A terminal tube of plastic composition comprising a base portion adapted to be secured to one side of a bulkhead or partition and having an extension of reduced cross-section extending outwardly from said bulkhead, said base portion having a recess therein, clamping means disposed within said recess for securing a flexible cable or rod passing through said terminal tube against longitudinal movement therein and a shrinkable self-sealing flexible tape engageable with said extension and said flexible cable for preventing leakage through said terminal tube and bulkhead.

4. A terminal tube of metal coated plastic composition comprising a base portion adapted to be secured to one side of a bulkhead or partition and having an extension of reduced cross-section extending outwardly from said bulkhead, said base portion having a recess therein, clamping means disposed within said recess for securing a flexible cable or rod passing through said terminal tube against longitudinal movement therein and a shrinkable sealing flexible member engageable with said extension and said flexible cable for preventing leakage through said terminal tube and bulkhead.

5. A terminal tube comprising a base portion adapted to be secured to a bulkhead or partition and an extension of reduced cross-section, said base portion having a recess therein, a strap disposed within said recess and encircling a cable or rod passing through said terminal tube, a set screw engageable with said strap for securing said cable against longitudinal movement in said terminal tube, and self-sealing means engageable with said extension and said cable for preventing leakage through said terminal tube and bulkhead.

6. A terminal tube comprising a base portion adapted to be secured to one side of a bulkhead or partition and having an extension of reduced cross-section extending outwardly from said bulkhead, said base portion having a recess therein, clamping means disposed within said recess for encircling and securing a flexible cable passing through said terminal tube against longitudinal movement therein, separate means accessible from the exterior of said base portion for actuating said clamping means, and a self-sealing flexible tape engageable with said extension and said flexible cable for preventing leakage through said terminal tube and bulkhead.

GEORGE C. THOMPSON.
ELLSWORTH F. SEAMAN.